(12) United States Patent
Choi et al.

(10) Patent No.: US 10,879,565 B2
(45) Date of Patent: Dec. 29, 2020

(54) ELECTROLYTE FOR RECHARGEABLE LITHIUM BATTERY AND RECHARGEABLE LITHIUM BATTERY

(71) Applicant: Samsung SDI Co., Ltd., Yongin-si (KR)

(72) Inventors: Hyunbong Choi, Yongin-si (KR); Pavel Shatunov, Yongin-si (KR); Olga Tsay, Yongin-si (KR); Hyejin Park, Yongin-si (KR); Myungheui Woo, Yongin-si (KR); Harim Lee, Yongin-si (KR); Jin-Hyeok Lim, Yongin-si (KR); Wonseok Cho, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 102 days.

(21) Appl. No.: 16/298,169

(22) Filed: Mar. 11, 2019

(65) Prior Publication Data

US 2019/0288337 A1 Sep. 19, 2019

(30) Foreign Application Priority Data

Mar. 16, 2018 (KR) .......................... 10-2018-0031041

(51) Int. Cl.
*H01M 6/04* (2006.01)
*H01M 10/0567* (2010.01)
*H01M 10/0525* (2010.01)

(52) U.S. Cl.
CPC ... *H01M 10/0567* (2013.01); *H01M 10/0525* (2013.01); *H01M 2300/0025* (2013.01)

(58) Field of Classification Search
CPC ......... H01M 10/0566; H01M 10/0564; H01M 10/0567; H01M 10/0568; H01M 10/0569;
(Continued)

(56) References Cited

U.S. PATENT DOCUMENTS 9,859,541 B2 * 1/2018 Bae .................. H01M 2/1653
10,199,686 B2 * 2/2019 Cha .................. H01M 10/052
(Continued)

FOREIGN PATENT DOCUMENTS

JP 2004-259697 A 9/2004
JP 2012-190791 A 10/2012
(Continued)

OTHER PUBLICATIONS

Korean Intellectual Property Office Notice of Allowance for corresponding Korean Patent Application No. 10-2018-0031041, dated May 21, 2020, 5 pages.

(Continued)

*Primary Examiner* — Raymond Alejandro
(74) *Attorney, Agent, or Firm* — Lewis Roca Rothgerber Christie LLP

(57) ABSTRACT

An electrolyte for a rechargeable lithium battery, including a non-aqueous organic solvent, a lithium salt, and an additive is disclosed. The additive includes a compound represented by Chemical Formula 1.

Chemical Formula 1

$$R^1 - \underset{\underset{O}{\|}}{\overset{\overset{O}{\|}}{S}} - N \underset{R^3}{\overset{R^2}{\diagdown}} $$
$$\underset{R^5}{\overset{}{Si}} - R^4$$

In Chemical Formula 1, each substituent is the same as described in the detailed description.

20 Claims, 4 Drawing Sheets

(58) Field of Classification Search
CPC ........... H01M 10/052; H01M 10/0525; H01M 10/0563; H01M 10/058; H01M 2300/0025; H01M 2300/028; H01M 2300/037; H01M 2300/0017
See application file for complete search history.

(56) References Cited

U.S. PATENT DOCUMENTS

| | | | |
|---|---|---|---|
| 10,320,032 B2 * | 6/2019 | Kim | H01M 10/0567 |
| 10,355,332 B2 * | 7/2019 | Lee | H01M 10/0562 |
| 2001/0041290 A1 | 11/2001 | Morigaki et al. | |
| 2011/0008680 A1 | 1/2011 | Muldoon et al. | |
| 2013/0337317 A1 | 12/2013 | Shima et al. | |
| 2015/0010811 A1 | 1/2015 | Egorov et al. | |

FOREIGN PATENT DOCUMENTS

| | | |
|---|---|---|
| JP | 2012-531714 A | 12/2012 |
| KR | 10-2005-0066166 A | 6/2005 |
| KR | 10-2008-0110160 A | 12/2008 |
| KR | 10-2015-0006364 A | 1/2015 |

OTHER PUBLICATIONS

Extended European Patent Search Report for corresponding European Patent Application No. 191599281, dated Aug. 12, 2019, 5 pages.

Sergeev, V.N., et al.; Silyl Method for the Synthesis of N-(Organosulfonamidomethyl) Lactams and Imides, Journal of General Chemistry of the USSR, vol. 57, No. 6, dated Jun. 1, 1987, 7 pages.

* cited by examiner

ELECTROLYTE FOR RECHARGEABLE LITHIUM BATTERY AND RECHARGEABLE LITHIUM BATTERY

CROSS-REFERENCE TO RELATED APPLICATION

This application claims priority to and the benefit of Korean Patent Application No. 10-2018-0031041, filed in the Korean Intellectual Property Office on Mar. 16, 2018, the entire content of which is incorporated herein by reference.

BACKGROUND

1. Field

An electrolyte for a rechargeable lithium battery and a rechargeable lithium battery including the same are disclosed.

2. Description of the Related Art

A rechargeable lithium battery may be recharged and has three or more times as high an energy density per unit weight as a related art lead storage battery, nickel-cadmium battery, nickel hydrogen battery, nickel zinc battery, and/or the like. It may be also charged at a high rate and thus, is commercially manufactured for a laptop, a cell phone, an electric tool, an electric bike, and/or the like, and researches on improvement of additional energy density have been actively made.

Such a rechargeable lithium battery is manufactured by injecting an electrolyte into a battery cell, which includes a positive electrode including a positive active material capable of intercalating/deintercalating lithium ions and a negative electrode including a negative active material capable of intercalating/deintercalating lithium ions.

The electrolyte may include an organic solvent (in which a lithium salt is dissolved) and may affect or determine (e.g., critically determine) the stability and performance of a rechargeable lithium battery.

$LiPF_6$, which is most commonly utilized as a lithium salt of an electrolyte, has a problem of reacting with an electrolytic solvent, thereby causing (e.g., promoting) depletion of the solvent and generation of a large amount of gas. When $LiPF_6$ is decomposed, it generates LiF and $PF_5$, which leads to electrolyte depletion in the battery, resulting in degradation in high temperature performance and poor safety.

There are needs for an electrolyte which suppresses side reactions of such a lithium salt and improves the performance of the battery.

SUMMARY

An aspect according to an embodiment is directed toward an electrolyte for a rechargeable lithium battery capable of ensuring high-temperature stability and thus improving the battery performance.

An aspect according to another embodiment is directed toward a rechargeable lithium battery including the electrolyte for a rechargeable lithium battery.

According to an embodiment of the present invention, an electrolyte for a rechargeable lithium battery includes a non-aqueous organic solvent, a lithium salt, and an additive, wherein the additive includes a compound represented by Chemical Formula 1.

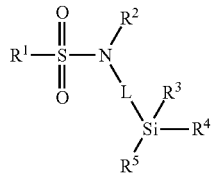

Chemical Formula 1

In Chemical Formula 1, $R^1$ to $R^5$ are each independently a substituted or unsubstituted C1 to C10 alkyl group, a substituted or unsubstituted C1 to C10 alkoxy group, a substituted or unsubstituted C2 to C10 alkenyl group, a substituted or unsubstituted C3 to C10 cycloalkyl group, a substituted or unsubstituted C3 to C10 cycloalkenyl group, or a substituted or unsubstituted C6 to C20 aryl group, L is a single bond, $C_n(R^a)_{2n}$—O—$C_m(R^b)_{2m}$, or a substituted or unsubstituted C1 to C5 alkylene group, wherein $R^a$ and $R^b$ are each independently hydrogen, a substituted or unsubstituted C1 to C5 alkyl group, or a substituted or unsubstituted C3 to C10 cycloalkyl group, and n and m are each independently an integer of 0 to 3.

The compound represented by Chemical Formula 1 may be represented by Chemical Formula 1-1 or Chemical Formula 1-2.

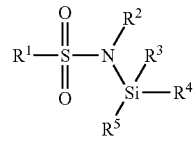

Chemical Formula 1-1

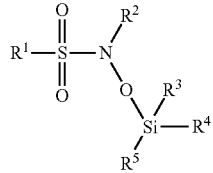

Chemical Formula 1-2

In Chemical Formula 1-1 and Chemical Formula 1-2, $R^1$ to $R^5$ are each independently a substituted or unsubstituted C1 to C10 alkyl group, a substituted or unsubstituted C1 to C10 alkoxy group, a substituted or unsubstituted C2 to C10 alkenyl group, a substituted or unsubstituted C3 to C10 cycloalkyl group, a substituted or unsubstituted C3 to C10 cycloalkenyl group, or a substituted or unsubstituted C6 to C20 aryl group.

$R^1$ to $R^5$ may each independently be a substituted or unsubstituted C1 to C10 alkyl group, or a substituted or unsubstituted C2 to C5 alkenyl group.

$R^1$ to $R^5$ may each independently be a substituted or unsubstituted C1 to C5 alkyl group. In particular, each of $R^1$ to $R^5$ may be a methyl group.

The compound represented by Chemical Formula 1 may be included in an amount of about 0.1 wt % to about 10 wt % based on a total amount (e.g., total weight) of the electrolyte for the rechargeable lithium battery.

The compound represented by Chemical Formula 1 may be included in an amount of about 0.5 wt % to about 3 wt % based on a total amount (e.g., total weight) of the electrolyte for the rechargeable lithium battery.

The additive may be the compound represented by Chemical Formula 1.

According to another embodiment, a rechargeable lithium battery includes a positive electrode; a negative electrode; and the electrolyte.

The positive electrode may include at least one active material selected from Li—Ni—Co—Al (NCA), Li—Ni—Co—Mn (NCM), lithium cobalt oxide (LiCoO$_2$), lithium manganese oxide (LiMnO$_2$), lithium nickel oxide (LiNiO$_2$), and lithium iron phosphate (LiFePO$_4$).

The rechargeable lithium battery may realize improved high-temperature stability and cycle-life characteristics.

BRIEF DESCRIPTION OF THE DRAWINGS

The accompanying drawings are included to provide a further understanding of the present disclosure, and are incorporated in and constitute a part of this specification. The drawings illustrate example embodiments of the present disclosure and, together with the description, serve to explain principles of the present disclosure. In the drawings.

DETAILED DESCRIPTION

Figure 1:
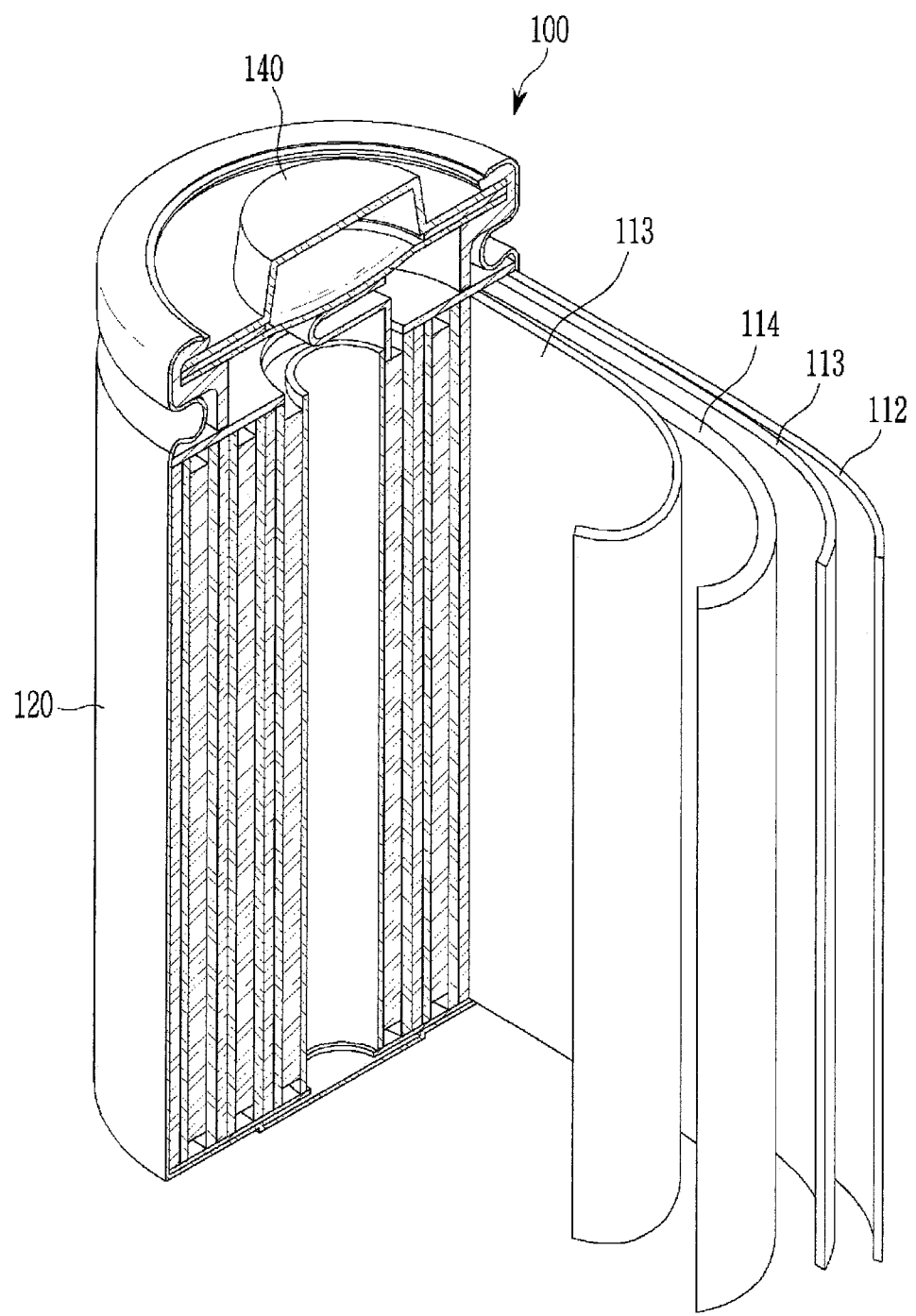
FIG. 1 is a schematic view of a rechargeable lithium battery according to an embodiment of the present invention.

Hereinafter, embodiments of the present invention are described. However, these embodiments are exemplary, and the present disclosure may be embodied in different forms and should not be construed as being limited to the embodiments set forth herein. Rather, all modifications, equivalents, and substituents which are included in the spirit and technical scope of the present disclosure are understood to be included in the present disclosure.

As used herein, when a definition is not otherwise provided, the term "substituted" refers to replacement of hydrogen of a compound by a substituent selected from a deuterium, a halogen atom (e.g., F, Br, Cl, or I), a hydroxy group, an alkoxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, a phosphoric acid or a salt thereof, a C1 to C20 alkyl group, a C2 to C20 alkenyl group, a C2 to C20 alkynyl group, a C6 to C30 aryl group, a C7 to C30 arylalkyl group, a C1 to C4 alkoxy group, a C1 to C20 heteroalkyl group, a C3 to C20 heteroarylalkyl group, a C3 to C30 cycloalkyl group, a C3 to C15 cycloalkenyl group, a C6 to C15 cycloalkynyl group, a C2 to C20 heterocycloalkyl group, and a combination thereof.

Hereinafter, an electrolyte for a rechargeable lithium battery according to an embodiment is described.

An electrolyte for a rechargeable lithium battery according to an embodiment includes a non-aqueous organic solvent, a lithium salt, and an additive, wherein the additive includes a compound represented by Chemical Formula 1.

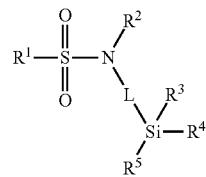

Chemical Formula 1

In Chemical Formula 1, $R^1$ to $R^5$ are each independently a substituted or unsubstituted C1 to C10 alkyl group, a substituted or unsubstituted C1 to C10 alkoxy group, a substituted or unsubstituted C2 to C10 alkenyl group, a substituted or unsubstituted C3 to C10 cycloalkyl group, a substituted or unsubstituted C3 to C10 cycloalkenyl group, or a substituted or unsubstituted C6 to C20 aryl group, L is a single bond, $C_n(R^a)_{2n}$—O—$C_m(R^b)_{2m}$, or a substituted or unsubstituted C1 to C5 alkylene group, wherein $R^a$ and $R^b$ are each independently hydrogen, a substituted or unsubstituted C1 to C5 alkyl group, or a substituted or unsubstituted C3 to C10 cycloalkyl group, and n and m are each independently an integer of (e.g., in a range from) 0 to 3.

In an embodiment, when n is at least 1, the at least two $R^a$ may be the same or different, and when m is at least 1, the at least two $R^b$ may be the same or different.

Generally, when an electrolyte is exposed to a high temperature, LiPF$_6$, as a lithium salt, may be decomposed into LiF and PF$_5$ in an electrolyte including a small amount of water, and HF produced from these decomposition products may react with an organic solvent to consume the organic solvent and react with the positive electrode to elute metal ions. Therefore, high-temperature stability and cycle-life characteristics of a lithium battery may be deteriorated.

According to an embodiment, when the additive including the compound represented by Formula 1 is utilized, a robust SEI (solid electrolyte interface) film having an excellent ion conductivity is formed on the surface of a negative electrode, and thereby it may suppress the decomposition of the surface of the negative electrode during a high-temperature cycle operation and may prevent or reduce an oxidation reaction of the electrolyte.

Further, the compound represented by Chemical Formula 1 may be present as a Li salt in the electrolyte, so that a low resistance (e.g., electrical resistance) effect may be exhibited.

That is, the compound represented by Chemical Formula 1 may form a composite with a thermal decomposition product of a lithium salt to suppress undesired side reactions with the electrolyte, thereby improving the cycle-life characteristics of the rechargeable lithium battery, and preventing or reducing the generation of gas inside the rechargeable lithium battery, and significantly (e.g., remarkably) reducing a defect occurrence rate.

In addition, the compound represented by Chemical Formula 1 and its oxide may participate in the electrochemical reaction with the components of the SEI film to make the film more robust, and may also improve the stability of other components included in the electrolyte due to an oxidative decomposition.

For example, the compound represented by Chemical Formula 1 may be represented by Chemical Formula 1-1 or Chemical Formula 1-2.

Chemical Formula 1-1

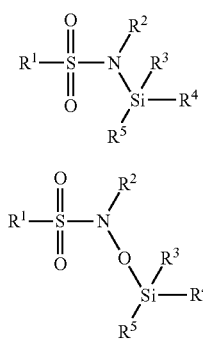

Chemical Formula 1-2

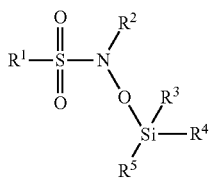

In Chemical Formula 1-1 and Chemical Formula 1-2, $R^1$ to $R^5$ are each independently a substituted or unsubstituted C1 to C10 alkyl group, a substituted or unsubstituted C1 to C10 alkoxy group, a substituted or unsubstituted C2 to C10 alkenyl group, a substituted or unsubstituted C3 to C10 cycloalkyl group, a substituted or unsubstituted C3 to C10 cycloalkenyl group, or a substituted or unsubstituted C6 to C20 aryl group.

For example, when the compound represented by Chemical Formula 1-1 is included, storage characteristics at a high temperature and electrolyte stability may be further improved.

For example, when the compound represented by Chemical Formula 1-2 is included, formation of an initial SEI film and cycle-life characteristics may be more favorable.

For example, $R^1$ to $R^5$ may each independently be a substituted or unsubstituted C1 to C10 alkyl group, or a substituted or unsubstituted C2 to C5 alkenyl group.

The substituted or unsubstituted C2 to C5 alkenyl group may be, for example, a vinyl group, but embodiments of the present disclosure are not limited thereto.

For example, $R^1$ to $R^5$ may each independently be a substituted or unsubstituted C1 to C5 alkyl group.

For specific examples, $R^1$ to $R^5$ may each independently be a methyl group, but embodiments of the present disclosure are not limited thereto.

The compound represented by Chemical Formula 1 may be included in an amount of about 0.1 wt % to about 10 wt %, for example, about 0.5 wt % to about 3 wt %, or about 0.5 wt % to about 1 wt %, based on a total amount (e.g., total weight) of the electrolyte for a rechargeable lithium battery.

When the amount of the compound represented by Chemical Formula 1 is in the above ranges, a resistance (e.g., electrical resistance) increase at a high temperature may be prevented or reduced, and a rechargeable lithium battery having improved cycle-life characteristics may be realized.

When the amount of the compound represented by Chemical Formula 1 is less than about 0.1 wt %, storage characteristics at a high temperature may be deteriorated. When the amount of the compound represented by Chemical Formula 1 is greater than about 10 wt %, an interface resistance may be increased and thus cycle-life may be deteriorated.

For example, the additive may be the compound represented by Chemical Formula 1.

The non-aqueous organic solvent serves as a medium for transmitting ions taking part in the electrochemical reaction of a battery.

The non-aqueous organic solvent may be carbonate-based, ester-based, ether-based, ketone-based, alcohol-based, and/or an aprotic solvent.

The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and/or the like. The ester-based solvent may include methyl acetate, ethyl acetate, n-propyl acetate, dimethylacetate, methylpropionate, ethylpropionate, propylpropionate, decanolide, mevalonolactone, caprolactone, and/or the like. The ether-based solvent may include dibutyl ether, tetraglyme, diglyme, dimethoxyethane, 2-methyltetrahydrofuran, tetrahydrofuran, and/or the like. In addition, the ketone-based solvent may include cyclohexanone, and/or the like. The alcohol-based solvent may include ethanol, isopropyl alcohol, and/or the like and the aprotic solvent may include nitriles (such as R—CN (wherein R is a hydrocarbon group having a C2 to C20 linear, branched, or cyclic structure and may include a double bond, an aromatic ring, or an ether bond), and/or the like), dioxolanes (such as 1,3-dioxolane, and/or the like), sulfolanes, and/or the like.

The non-aqueous organic solvent may be utilized alone or in a mixture. When the organic solvent is utilized in a mixture, the mixture ratio may be controlled in accordance with a desirable battery performance.

The carbonate-based solvent may be prepared by mixing a cyclic carbonate and a linear carbonate. When the cyclic carbonate and the linear carbonate are mixed together in a volume ratio of about 1:1 to about 1:9, an electrolyte performance may be improved.

The non-aqueous organic solvent may further include an aromatic hydrocarbon-based organic solvent in addition to the carbonate based solvent. Herein, the carbonate-based solvent and the aromatic hydrocarbon-based organic solvent may be mixed in a volume ratio of about 1:1 to about 30:1.

The aromatic hydrocarbon-based organic solvent may be an aromatic hydrocarbon-based compound of Chemical Formula 2.

Chemical Formula 2

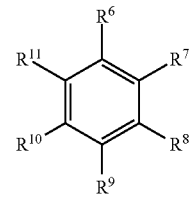

In Chemical Formula 2, $R^6$ to $R^{11}$ may be the same or different and may be each independently selected from hydrogen, a halogen, a C1 to C10 alkyl group, a haloalkyl group, and a combination thereof.

Specific examples of the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include vinylene carbonate and/or an ethylene carbonate-based compound represented by Chemical Formula 3 in order to improve the cycle-life of a battery.

Chemical Formula 3

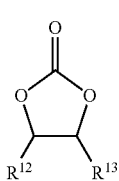

In Chemical Formula 3, $R^{12}$ and $R^{13}$ may be the same or different and may be each independently selected from hydrogen, a halogen, a cyano group (CN), a nitro group ($NO_2$), and a fluorinated C1 to C5 alkyl group, provided that at least one of $R^{12}$ and $R^{13}$ is a halogen, a cyano group (CN), a nitro group ($NO_2$), or a fluorinated C1 to C5 alkyl group, and that $R^{12}$ and $R^{13}$ are not simultaneously hydrogen.

Examples of the ethylene carbonate-based compound may be difluoroethylene carbonate, chloroethylene carbonate, dichloroethylene carbonate, bromoethylene carbonate, dibromoethylene carbonate, nitroethylene carbonate, cyanoethylene carbonate, and fluoroethylene carbonate. The amount of the additive for improving cycle-life may be utilized within a suitable (e.g., an appropriate) range.

The lithium salt dissolved in the non-organic solvent supplies lithium ions in a battery, enables the basic operation of a rechargeable lithium battery, and improves transportation of the lithium ions between the positive and negative electrodes. Examples of the lithium salt include at least one supporting salt selected from $LiPF_6$, $LiBF_4$, $LiSbF_6$, $LiAsF_6$, $LiN(SO_2C_2F_6)_2$, $Li(CF_3SO_2)_2N$, $LiN(SO_3C_2F_6)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, (wherein x and y are natural numbers, for example, an integer of 1 to 20), LiCl, LiI, and $LiB(C_2O_4)_2$ (lithium bis(oxalato) borate; LiBOB). The lithium salt may be utilized in a concentration of from about 0.1 M to about 2.0 M. When the lithium salt is included at the above concentration range, the electrolyte may have excellent performance and lithium ion mobility due to favorable (e.g., optimal) electrolyte conductivity and viscosity.

Another embodiment provides a rechargeable lithium battery including a positive electrode; a negative electrode; and the electrolyte.

The positive electrode includes a current collector, and a positive active material layer disposed on the current collector and including a positive active material.

The positive active material may include lithiated intercalation compounds that reversibly intercalate and deintercalate lithium ions.

In one embodiment, at least one composite oxide of lithium and a metal of cobalt, manganese, nickel, or a combination thereof may be utilized.

For example, the positive active material may be at least one selected from Li—Ni—Co—Al (NCA), Li—Ni—Co—Mn (NCM), lithium cobalt oxide ($LiCoO_2$), lithium manganese oxide ($LiMnO_2$), lithium nickel oxide ($LiNiO_2$), and lithium iron phosphate ($LiFePO_4$).

Examples of the positive active material may be a compound represented by one of the chemical formulae below.
$Li_aA_{1-b}X_bD_2$ ($0.90 \le a \le 1.8$, $0 \le b \le 0.5$); $Li_aA_{1-b}X_bO_{2-c}D_c$ ($0.90 \le a \le 1.8$, $0 \le b \le 0.5$, $0 \le c \le 0.05$); $Li_aE_{1-b}X_bO_{2-c}D_c$ ($0.90 \le a \le 1.8$, $0 \le b \le 0.5$, $0 \le c \le 0.05$); $Li_aE_{2-b}X_bO_{4-c}D_c$ ($0.90 \le a \le 1.8$, $0 \le b \le 0.5$, $0 \le c \le 0.05$); $Li_aNi_{1-b-c}Co_bX_cD_\alpha$ ($0.90 \le a \le 1.8$, $0 \le b \le 0.5$, $0 \le c \le 0.5$, $0 \le \alpha \le 2$); $Li_aNi_{1-b-c}Co_bX_cO_{2-\alpha}T_\alpha$ ($0.90 \le a \le 1.8$, $0 \le b \le 0.5$, $0 \le c \le 0.05$, $0 < \alpha < 2$); $Li_aNi_{1-b-c}Co_bX_cO_{2-\alpha}T_2$ ($0.90 \le a \le 1.8$, $0 \le b \le 0.5$, $0 \le c \le 0.05$, $0 < \alpha < 2$); $Li_aNi_{1-b-c}Mn_bX_cD_\alpha$ ($0.90 \le a \le 1.8$, $0 \le b \le 0.5$, $0 \le c \le 0.05$, $0 < \alpha < 2$); $Li_aNi_{1-b-c}Mn_bX_cO_{2-\alpha}T_\alpha$ ($0.90 \le a \le 1.8$, $0 \le b \le 0.5$, $0 < c \le 0.05$, $0 < \alpha < 2$); $Li_aNi_{1-b-c}Mn_bX_cO_{2-\alpha}T_2$ ($0.90 \le a \le 1.8$, $0 \le b \le 0.5$, $0 \le c \le 0.05$, $0 < \alpha < 2$); $Li_aNi_bE_cG_dO_2$ ($0.90 \le a \le 1.8$, $0 \le b \le 0.9$, $0 \le c \le 0.5$, $0.001 \le d \le 0.1$); $Li_aNi_{b-}Co_cMn_dG_eO_2$ ($0.90 \le a \le 1.8$, $0 \le b \le 0.9$, $0 \le c \le 0.5$, $0 \le d \le 0.5$, $0.001 \le e \le 0.1$); $Li_aNiG_bO_2$ ($0.90 \le a \le 1.8$, $0.001 \le b \le 0.1$); $Li_aCoG_bO_2$ ($0.90 \le a \le 1.8$, $0.001 \le b \le 0.1$); $Li_aMn_{1-b}G_bO_2$ ($0.90 \le a \le 1.8$, $0.001 \le b \le 0.1$); $Li_aMn_2G_bO_4$ ($0.90 \le a \le 1.8$, $0.001 \le b \le 0.1$); $Li_aMn_{1-g}G_gPO_4$ ($0.90 \le a \le 1.8$, $0 \le g \le 0.5$); $QO_2$; $QS_2$; $LiQS_2$; $V_2O_5$; $LiV_2O_5$; $LiZO_2$; $LiNiVO_4$; $Li_{(3-f)}J_2(PO_4)_3 (0 \le f \le 2)$; $Li_{(3-f)}Fe_2(PO_4)_3 (0 \le f \le 2)$; or $Li_aFePO_4$ ($0.90 \le a \le 1.8$).

In the chemical formulae above, A is selected from Ni, Co, Mn, and a combination thereof; X is selected from Al, Ni, Co, Mn, Cr, Fe, Mg, Sr, V, a rare earth element, and a combination thereof; D is selected from O, F, S, P, and a combination thereof; E is selected from Co, Mn, and a combination thereof; T is selected from F, S, P, and a combination thereof; G is selected from Al, Cr, Mn, Fe, Mg, La, Ce, Sr, V, and a combination thereof; Q is selected from Ti, Mo, Mn, and a combination thereof; Z is selected from Cr, V, Fe, Sc, Y, and a combination thereof; and J is selected from V, Cr, Mn, Co, Ni, Cu, and a combination thereof.

The compounds (e.g., the positive active material) may have a coating layer on the surface thereof, or may be mixed with another compound having a coating layer. The coating layer may include at least one coating element compound selected from an oxide of a coating element, a hydroxide of a coating element, an oxyhydroxide of a coating element, an oxycarbonate of a coating element, and a hydroxy carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be disposed in a suitable method having no adverse influence on properties of the positive active material by utilizing these elements in the compound. For example, the method may include any suitable coating method (e.g., spray coating, dipping, etc.).

Specific examples of the positive active material according to an embodiment may be $Li_xNi_yCo_zAl_{1-y-z}O_2$ ($1 \le x \le 1.2$, $0.5 \le y \le 1$ and $0 \le z \le 0.5$).

The positive active material may be included in an amount of about 90 wt % to about 98 wt % based on a total weight of the positive active material layer.

In an embodiment of the present invention, the positive active material layer may further include a binder and a conductive material. Herein, the binder and the conductive material may be included in an amount of about 1 wt % to about 5 wt %, respectively, based on a total amount of the positive active material layer.

The binder improves the binding properties of the positive active material particles with one another and with a current collector. Examples thereof may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but embodiments of the present disclosure are not limited thereto.

The conductive material is included to provide electrode conductivity. Any suitable electrically conductive material may be utilized as a conductive material unless it causes a chemical change. Examples of the conductive material may include a carbon-based material (such as natural graphite, artificial graphite, carbon black, acetylene black, ketjenblack, a carbon fiber, and/or the like); a metal-based material of a metal powder or a metal fiber including copper, nickel, aluminum, silver, and the like; a conductive polymer (such as a polyphenylene derivative); and a mixture thereof.

The current collector may utilize Al, but embodiments of the present disclosure are not limited thereto.

The negative electrode includes a current collector, and a negative active material layer formed on the current collector and including a negative active material.

The negative active material may include a material that reversibly intercalates/deintercalates lithium ions, a lithium metal, a lithium metal alloy, a material being capable of doping/dedoping lithium (e.g., lithium ions), and/or a transition metal oxide.

The material that reversibly intercalates/deintercalates lithium ions may include a carbon material. The carbon material may be any generally-utilized carbon-based negative active material in a rechargeable lithium ion battery. Examples thereof may be crystalline carbon, amorphous carbon, and a mixture thereof.

The crystalline carbon may be non-shaped (e.g., without a regular shape), or sheet, flake, spherical, or fiber shaped natural graphite and/or artificial graphite. The amorphous carbon may be a soft carbon, a hard carbon, a mesophase pitch carbonization product, fired coke, and/or the like.

The lithium metal alloy may include an alloy of lithium and a metal selected from Na, K, Rb, Cs, Fr, Be, Mg, Ca, Sr, Si, Sb, Pb, In, Zn, Ba, Ra, Ge, Al, and Sn.

The material being capable of doping/dedoping lithium (e.g., lithium ions) may be Si, Si—C composite, $SiO_x$ (0<x<2), a Si-Q alloy (wherein Q is an element selected from an alkali metal, an alkaline-earth metal, a Group 13 element, a Group 14 element excluding Si, a Group 15 element, a Group 16 element, a transition metal, a rare earth element, and a combination thereof), Sn, $SnO_2$, a Sn—R alloy (wherein R is an element selected from an alkali metal, an alkaline-earth metal, a Group 13 element, a Group 14 element excluding Sn, a Group 15 element, a Group 16 element, a transition metal, a rare earth element, and a combination thereof), and/or the like. At least one of these materials may be mixed with $SiO_2$. In one embodiment, the elements Q and R may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof.

The transition metal oxide may be vanadium oxide, lithium vanadium oxide, and/or lithium titanium oxide.

In the negative active material layer, the negative active material may be included in an amount of about 95 wt % to about 99 wt % based on a total weight of the negative active material layer.

In an embodiment of the present invention, the negative active material layer includes a binder, and optionally a conductive material. In the negative active material layer, a content of the binder may be about 1 wt % to about 5 wt % based on a total weight of the negative active material layer. When the negative active material layer includes a conductive material, the negative active material layer includes about 90 wt % to about 98 wt % of the negative active material, about 1 wt % to about 5 wt % of the binder, and about 1 wt % to about 5 wt % of the conductive material.

The binder improves the binding properties of the negative active material particles with one another and with a current collector. The binder includes a non-water-soluble binder, a water-soluble binder, or a combination thereof.

The non-water-soluble binder may be selected from polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, and a combination thereof.

The water-soluble binder may be a rubber-based binder or a polymer resin binder. The rubber-based binder may be selected from a styrene-butadiene rubber, an acrylated styrene-butadiene rubber (SBR), an acrylonitrile-butadiene rubber, an acrylic rubber, a butyl rubber, a fluorine rubber, and a combination thereof. The polymer resin binder may be selected from polytetrafluoroethylene, polyethylene, polypropylene, ethylenepropylenecopolymer, polyethyleneoxide, polyvinylpyrrolidone, polyepichlorohydrine, polyphosphazene, polyacrylonitrile, polystyrene, an ethylenepropylenediene copolymer, polyvinylpyridine, chlorosulfonated polyethylene, latex, a polyester resin, an acrylic resin, a phenolic resin, an epoxy resin, polyvinyl alcohol, and a combination thereof.

When the water-soluble binder is utilized as a negative electrode binder, a cellulose-based thickener may be further utilized to provide a suitable viscosity. The cellulose-based thickener includes one or more of carboxymethyl cellulose, hydroxypropylmethyl cellulose, methyl cellulose, and/or alkali metal salts thereof. The alkali metals may be Na, K, and/or Li. Such a thickener may be included in an amount of about 0.1 parts to about 3 parts by weight based on 100 parts by weight of the negative active material.

The conductive material is included to provide electrode conductivity. Any suitable electrically conductive material may be utilized as a conductive material unless it causes a chemical change. Examples of the conductive material include a carbon-based material (such as natural graphite, artificial graphite, carbon black, acetylene black, ketjenblack, a carbon fiber, and/or the like); a metal-based material of a metal powder or a metal fiber including copper, nickel, aluminum silver, and/or the like; a conductive polymer (such as a polyphenylene derivative); and a mixture thereof.

The current collector may include one selected from a copper foil, a nickel foil, a stainless steel foil, a titanium foil, a nickel foam, a copper foam, a polymer substrate coated with a conductive metal, and a combination thereof.

The rechargeable lithium battery may further include a separator between the negative electrode and the positive electrode, depending on a kind of the rechargeable lithium battery. Examples of a suitable separator material include polyethylene, polypropylene, polyvinylidene fluoride, and multi-layers thereof, such as a polyethylene/polypropylene double-layered separator, a polyethylene/polypropylene/polyethylene triple-layered separator, and/or a polypropylene/polyethylene/polypropylene triple-layered separator.

Referring to FIG. 1, a rechargeable lithium battery 100 according to an embodiment includes a battery cell including a negative electrode 112, a positive electrode 114 facing the negative electrode 112, a separator 113 interposed between the negative electrode 112 and the positive electrode 114, and an electrolyte (not shown) for the rechargeable lithium battery impregnating the negative electrode 112, the positive electrode 114, and the separator 113, a battery case 120 for housing the battery cell, and a sealing member 140 for sealing the battery case 120.

Hereinafter, examples of the present disclosure and comparative examples are described. These examples, however, are not in any sense to be interpreted as limiting the scope of the invention.

Manufacture of Rechargeable Lithium Battery (e.g., Rechargeable Lithium Battery Cell)

Preparation Example 1

Synthesis of Compound Represented by Chemical Formula 1a (N-methyl-N-(trimethylsilyl)-methane sulfonamide)

N-methylmethane sulfonamide (10.0 g, 9.16 mmol) and bis(trimethylsilyl)amine (29.0 g, 18.3 mmol) were put along with ammonium chloride in a catalyst amount (0.2 g) under a nitrogen atmosphere. The mixture was stirred at 100° C. for 2 hours and then, at 130° C. for 1 hour more. A resultant therefrom was purified through distillation under a reduced pressure to obtain a colorless transparent liquid. (7.5 g, 75%)

bp=58° C./0.07 Torr; 1H NMR (400 MHz, CDCl3): 2.85 (s, 3H), 2.83 (s, 3H), 0.33 (s, 9H); 13C NMR (100 MHz, CDCl3): δ 39.52, 32.58, 0.81.

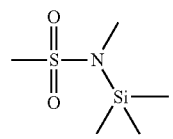

Chemical Formula 1a

Preparation Example 2

Synthesis of Compound Represented by Chemical Formula 1b (N-methyl-N-trimethylsilyloxymethane sulfonamide)

Step 1: Synthesis of N-hydroxy-N-methylmethane sulfonamide

N-methylhydroxylamine hydrochloride (10.0 g, 120 mmol) was dissolved in water (12 mL), and the solution was cooled down to 0° C. Subsequently, another solution prepared by dissolving $K_2CO_3$ (16.5 g, 120 mmol) in 20 mL of water was slowly added thereto in a dropwise fashion. The obtained mixture was stirred for 30 minutes at 0° C. Tetrahydrofuran (THF, 60 mL) and methanol (15 mL) were added threreto while the temperature was maintained, and the obtained mixture was stirred for 10 minutes. Then, methanesulfonyl chloride (6.85 g, 59.8 mmol) was slowly added thereto in a dropwise fashion at 0° C., and the obtained mixture was stirred for 30 minutes. Subsequently, the reactant was heated up to room temperature and further stirred for 4 hours. Water was added thereto, until a white solid precipitated therein was all dissolved, and an extraction was performed by utilizing diethyl ether. An organic layer gathered therefrom was dried with $MgSO_4$, filtered, and concentrated under a reduced pressure to obtain a white solid (4.96 g, 66%). The solid was not purified any more but utilized in the next reaction.

1H NMR (400 MHz, CDCl3): 3.06 (s, 3H), 2.95 (s, 3H).

Step 2: Synthesis of N-methyl-N-trimethylsilyloxymethane sulfonamide

N-hydroxy-N-methylmethane sulfonamide synthesized in Step 1 was dissolved in tetrahydrofuran (THF, 50 mL) under a nitrogen atmosphere. The solution was cooled down to 0° C., and triethylamine (TEA, 6.02 g, 59.5 mmol) was added thereto in a dropwise fashion. Subsequently, trimethylsilyl chloride (TMSCl, 8.89 g, 59.5 mmol) was slowly added thereto in a dropwise fashion. The reactant was stirred for 2 hours. After filtering out a white solid precipitated therein, a filtrate therefrom was concentrated. The concentrated product was purified through distillation under a reduced pressure to obtain a colorless transparent liquid. (5.4 g, 69%)

bp=74° C./0.07 Torr; 1H NMR (400 MHz, CDCl3): 3.00 (s, 3H), 2.88 (s, 3H), 0.25 (s, 9H); 13C NMR (100 MHz, CDCl3): δ 42.55, 29.27, −0.51.

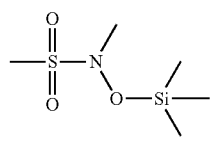

Chemical Formula 1b

Example 1

A positive active material slurry was prepared by utilizing $LiNi_{0.8}Co_{0.15}Al_{0.05}O_2$ as a positive active material, polyvinylidene fluoride as a binder, and ketjenblack as a conductive material in a weight ratio of 97.3:1.4:1.3, and then dispersing the mixture in N-methyl pyrrolidone.

The positive active material slurry was coated on a 15 μm-thick Al foil, dried at 100° C., and pressed to manufacture a positive electrode.

Also, a negative active material slurry was prepared by mixing graphite as a negative active material, polyvinylidene fluoride as a binder, and ketjenblack as a conductive material in a weight ratio of 98:1:1 and then dispersing the mixture in N-methyl pyrrolidone.

The negative active material slurry was coated on a 10 μm-thick Cu foil, dried at 100° C., and pressed to manufacture a negative electrode.

The positive and negative electrodes, a 25 μm-thick polyethylene separator, and an electrolyte solution were utilized to manufacture a rechargeable lithium battery cell.

The electrolyte (e.g., the electrolyte solution) has the following composition.

(Electrolyte Composition)

Salt: 1.5 M $LiPF_6$

Solvent: ethylene carbonate:ethylmethyl carbonate:dimethyl carbonate (EC:EMC:DMC=a volume ratio of 2:1:7)

Additive: 1 wt % of the compound represented by Chemical Formula 1a

Herein, in the electrolyte composition, "wt %" is based on a total amount of the electrolyte (i.e., the total amount of the lithium salt+the non-aqueous organic solvent+the additive).

Example 2

A rechargeable lithium battery cell was manufactured according to the same method as Example 1 except that the compound represented by Chemical Formula 1b was utilized as the additive.

Example 3

A rechargeable lithium battery cell was manufactured according to the same method as Example 1 except that the additive was utilized in an amount of 0.5 wt %.

Example 4

A rechargeable lithium battery cell was manufactured according to the same method as Example 1 except that the additive was utilized in an amount of 3 wt %.

Example 5

A rechargeable lithium battery cell was manufactured according to the same method as Example 2 except that the additive was utilized in an amount of 0.5 wt %.

Example 6

A rechargeable lithium battery cell was manufactured according to the same method as Example 2 except that the additive was utilized in an amount of 3 wt %.

Comparative Example 1

A rechargeable lithium battery cell was manufactured according to the same method as Example 1 except that the additive was not utilized.

Comparative Example 2

A rechargeable lithium battery cell was manufactured according to the same method as Example 1 except that the additive was changed into N,N-dimethylmethane sulfonamide (DMS, Aldrich-Sigma Co., Ltd.).

N,N-dimethylmethane Sulfonamide

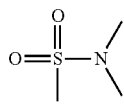

Battery Characteristics Evaluation
Evaluation 1: CV Characteristics Evaluation
Electrochemical stability of the rechargeable lithium battery cells according to Comparative Example 1 and Examples 1 and 2 was evaluated by measuring the cyclic voltammetry (CV), and the results are shown in FIGS. 2 to 4.

A negative electrode cyclic voltammetry (CV) was measured by mixing a triple electrode electrochemical cell utilizing graphite as a working electrode and Li metals as a reference electrode and a counter electrode. Herein, 3 cycles of the scan were performed, each cycle being from 3 V to 0 V and then from 0 V to 3 V at a rate of 0.1 mV/sec.

Figure 2:
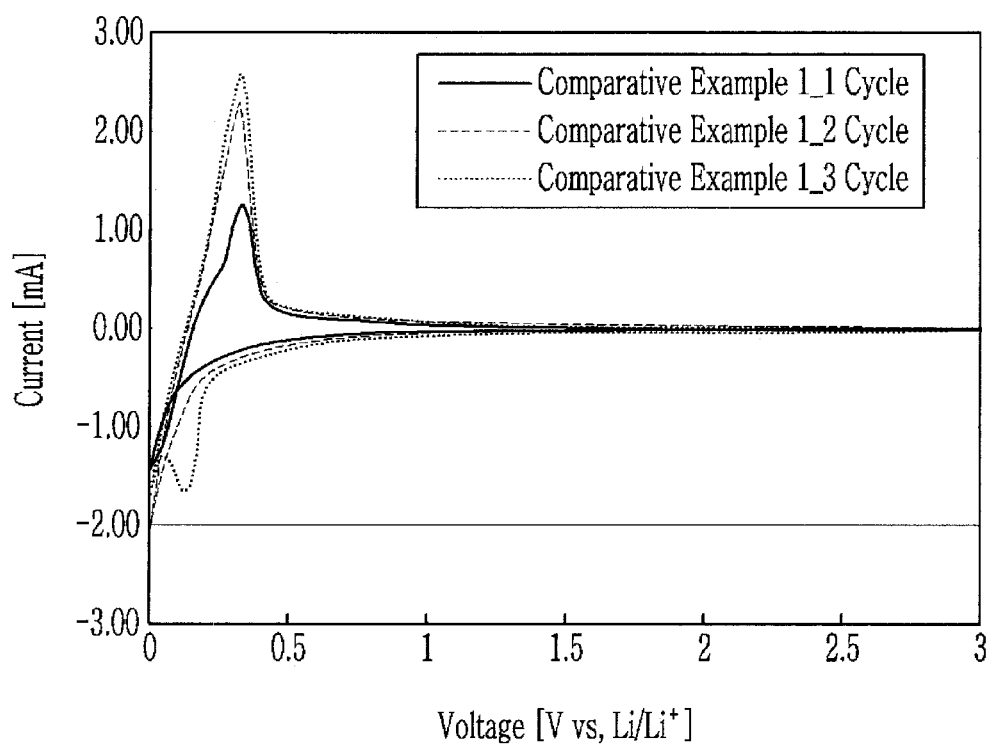
FIG. 2 is a graph showing a negative electrode cyclic voltammetry (CV) utilizing the electrolyte according to Comparative Example 1.

FIG. 2 is a graph showing a negative electrode cyclic voltammetry (CV) utilizing the electrolyte according to Comparative Example 1.

Figure 3:
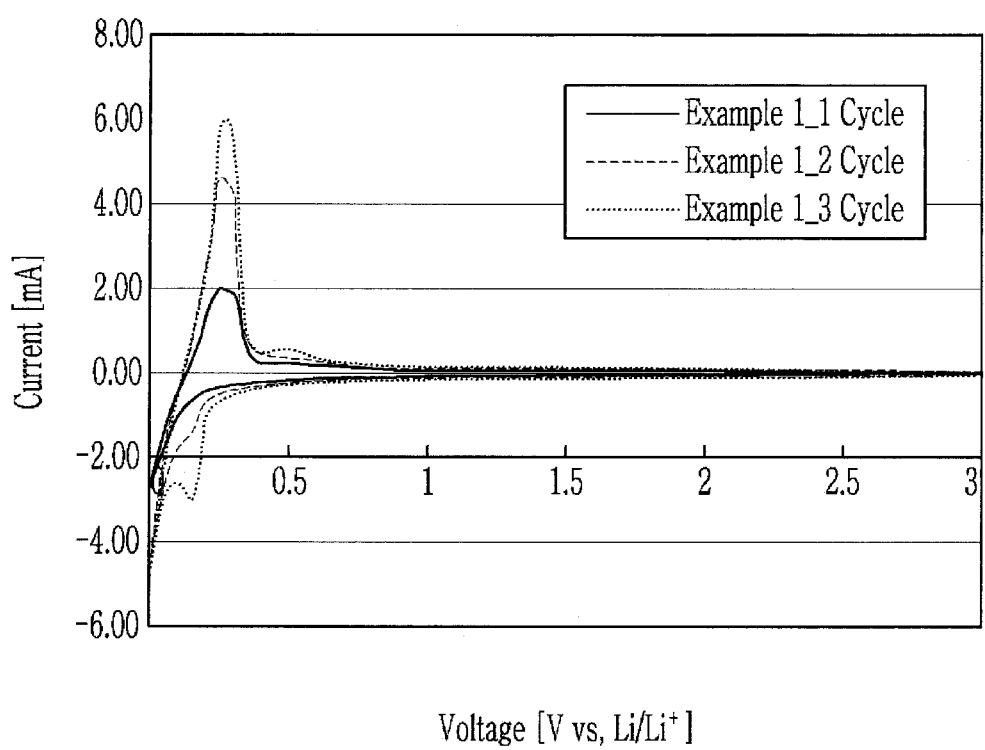
FIG. 3 is a graph showing a negative electrode cyclic voltammetry (CV) utilizing the electrolyte according to Example 1.
Figure 4:
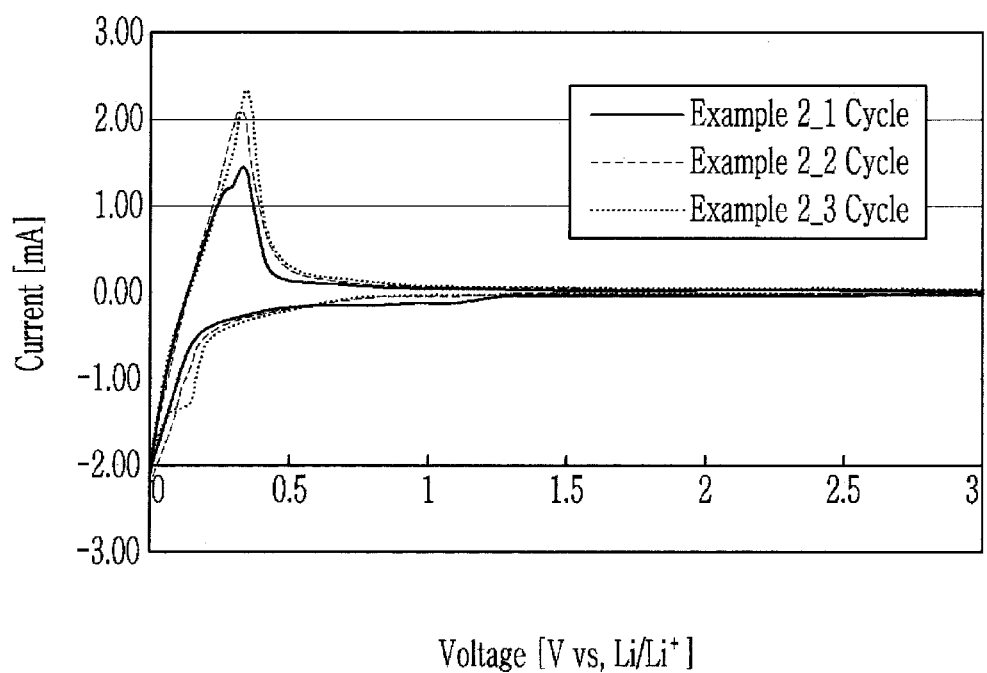
FIG. 4 is a graph showing a negative electrode cyclic voltammetry (CV) utilizing the electrolyte according to Example 2.

FIG. 3 is a graph showing a negative electrode cyclic voltammetry (CV) utilizing the electrolyte according to Example 1.

FIG. 4 is a graph showing a negative electrode cyclic voltammetry (CV) utilizing the electrolyte according to Example 2.

As shown in FIG. 3, the cyclic voltammetry curve of a triple electrode electrochemical cell including the electrolyte solution of Example 1 showed a low negative electrode decomposition tendency. However, as shown in FIG. 2, the cyclic voltammetry curve of a triple electrode electrochemical cell including the electrolyte solution of Comparative Example 1 showed a high negative electrode decomposition tendency. As for the high negative electrode decomposition tendency of Comparative Example 1, an excessive coating layer was formed on the surface of the negative electrode, thereby increased the sheet resistance, and accordingly, suppressed the lithium movement and resultantly, deteriorated the cycle-life characteristics of the cell.

Accordingly, the cycle-life characteristics of the rechargeable lithium battery cell according to Example 1 were improved, and thus the rechargeable lithium battery cell could have excellent battery performance.

In addition, as shown in FIG. 4, in the cyclic voltammetry curve of a triple electrode electrochemical cell including the electrolyte solution of Example 2, a reduction peak appeared according to every cycle. However, as shown in FIG. 2, in the cyclic voltammetry curve of a triple electrode electrochemical cell including the electrolyte solution of Comparative Example 1, a reduction peak did not appear at all. Referring to these results, an initial SEI film was formed on the negative electrode over a wide voltage region, before a solvent was decomposed during the charge process of inserting lithium ions into the negative electrode in the rechargeable lithium battery cell including the electrolyte solution of Example 2. Accordingly, the rechargeable lithium battery cell according to Example 2 was expected to have excellent battery performance compared with the rechargeable lithium battery cell having no initial SEI film according to Comparative Example 1.

Evaluation 2: Storage Characteristics at High Temperature

Each rechargeable lithium battery cell according to Examples 1 to 6 and Comparative Examples 1 and 2 was placed at 60° C. for 30 days in a state of charge ((SOC) =100%, i.e., fully charged) to evaluate resistance increase rates when being placed (e.g., aged) at a high temperature of 60° C. The results are shown in Table 1.

Herein, an initial formation condition was performed as follows: each cell was CC-charged to 3.6 V at a current of 0.2 C and discharged to 2.6 V in the first cycle and then, CC-charged to 4.2 V at a current of 0.2 C and discharged to 2.6 V in the second cycle, and accordingly, an oxide film was formed on the surface of an electrode.

Initial capacity and capacity after being aged for 30 days were measured as follows: each cell was CC-CV charged to 4.2 V at a current of 1 C and discharged at a current of 3 C to measure 2.6 V cut-off discharge capacity.

Capacity retention (%) was obtained as a percentage of the capacity after being aged for 30 days relative to the initial capacity.

DC resistance (DC-IR) was measured as follows.

DC resistance (DC-IR) was calculated from each current difference and voltage difference when different currents were respectively applied.

First, the cells in fully charged states were discharged at a current of 10 A under a constant current for 10 seconds.

Subsequently, the cells were discharged at a current of 1 A under a constant current for 10 seconds and then discharged at a current of 10 A under a constant current for 4 seconds.

DC resistance (DC-IR) was calculated according to $\Delta R=\Delta V/\Delta I$ from the data at 18 seconds and 23 seconds.

Resistance increase rates (%) were obtained as percentages of the DC-IR after being aged for 30 days relative to the initial DC-IR.

TABLE 1

| | Initial | 60° C. @30 days | |
|---|---|---|---|
| | DC-IR (mOhm) | DC-IR (mOhm) | Δ DC-IR (%) |
| Comparative Example 1 | 35.8 | 42.9 | 120 |
| Comparative Example 2 | 37.3 | 43.9 | 117 |
| Example 1 | 35.1 | 38.2 | 108 |
| Example 2 | 35.3 | 39.5 | 111 |
| Example 3 | 36.8 | 39.3 | 107 |
| Example 4 | 35.9 | 40.2 | 112 |
| Example 5 | 36.9 | 39.4 | 107 |
| Example 6 | 35.8 | 40.5 | 113 |

Referring to Table 1, Examples 1 to 6 utilizing an additive according to an embodiment showed low resistance increase rates when being placed at a high temperature of 60° C. compared with Comparative Examples 1 and 2. Accordingly, when the compound represented by Chemical Formula 1 was utilized as an additive, high-temperature oxidation resistance and a low electrical resistance of a cell in a charged state were improved.

Evaluation 3: Evaluation of Electrolyte Safety

Electrolyte safety of the rechargeable lithium battery cells according to Examples 1 and 2 and Comparative Examples 1 and 2 were evaluated by placing each rechargeable lithium battery cell at a high temperature of 60° C. in a state of charge (SOC=100%) for 7 days and measuring the HF concentration increase rates when being aged at 60° C. in the following method.

The HF concentration increase rates (%) were percentages of the HF concentrations after being aged at a high temperature for 7 days relative to the initial HF concentrations.

Measurement of HF Concentration

An electrolyte solution was adjusted to have a concentration of 10% by adding water thereto, titrating it with a 0.1 M KOH aqueous solution, and calculating an amount of HF, which is an acid present in the electrolyte solution, by utilizing the equation of MV=M'V', based on the relationship that the product of molar concentration (M) and (x) volume (V) equals the number of moles (mol), and the results are shown in Table 2.

TABLE 2

| | HF initial concentration (ppm) | HF concentration after placed at high temperature (ppm) | HF concentration increase rate (@60° C. @30 day) (%) |
|---|---|---|---|
| Comparative Example 1 | 20 | 50.4 | 252 |
| Comparative Example 2 | 20.7 | 51.3 | 248 |
| Example 1 | 20.2 | 23.5 | 116 |

Referring to Table 2, Comparative Examples 1 and 2 showed a sharp HF concentration increase compared with Example 1, which includes the additive according to an embodiment. In other words, a rechargeable lithium battery cell according to an embodiment of the present invention showed excellent effect of suppressing a side reaction with an electrolyte solution when being placed at a high temperature.

Evaluation 4: Evaluation of Cycle-Life Characteristics

The rechargeable lithium battery cells according to Examples 1 and 2 and Comparative Examples 1 and 2 were respectively CC-CV charged with a cut-off of 4 A, 4.2 V, and 100 mA and then, CC discharged with a cut-off of 10 A and 2.5 V as one cycle at room temperature, which was repeated 200 times to evaluate the cycle-life characteristics, and the capacity retentions of the cells after 200 cycles are shown in Table 3.

TABLE 3

| | Capacity retention (%) after 200 cycles |
|---|---|
| Comparative Example 1 | 94.2 |
| Comparative Example 2 | 94.5 |
| Example 1 | 94.9 |
| Example 2 | 94.6 |

Referring to Table 3, Examples 1 and 2 according to the present invention showed excellent charge and discharge cycle characteristics compared with Comparative Examples 1 and 2, and accordingly, the rechargeable lithium battery cells including the compound represented by Chemical Formula 1 as an additive showed excellent cycle-life characteristics.

Expressions such as "at least one of," when preceding a list of elements, modify the entire list of elements and do not modify the individual elements of the list. Further, the use of "may" when describing embodiments of the inventive concept refers to "one or more embodiments of the inventive concept." Also, the term "exemplary" is intended to refer to an example or illustration.

As used herein, the term "substantially," "about," and similar terms are used as terms of approximation and not as terms of degree, and are intended to account for the inherent deviations in measured or calculated values that would be recognized by those of ordinary skill in the art. Moreover, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112, first paragraph, or 35 U.S.C. § 112(a), and 35 U.S.C. § 132(a).

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims, and equivalents thereof.

DESCRIPTION OF THE SYMBOLS

100: rechargeable lithium battery
112: negative electrode
113: separator
114: positive electrode
120: battery case
140: sealing member

What is claimed is:

1. An electrolyte for a rechargeable lithium battery, comprising
a non-aqueous organic solvent, a lithium salt, and an additive,
wherein the additive comprises a compound represented by Chemical Formula 1:

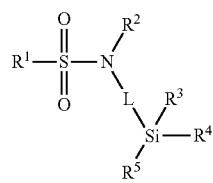

Chemical Formula 1 wherein, in Chemical Formula 1,
$R^1$ to $R^5$ are each independently a substituted or unsubstituted C1 to C10 alkyl group, a substituted or unsubstituted C1 to C10 alkoxy group, a substituted or unsubstituted C2 to C10 alkenyl group, a substituted or unsubstituted C3 to C10 cycloalkyl group, a substituted or unsubstituted C3 to C10 cycloalkenyl group, or a substituted or unsubstituted C6 to C20 aryl group,
L is a single bond, $C_n(R^a)_{2n}$—O—$C_m(R^b)_{2m}$, or a substituted or unsubstituted C1 to C5 alkylene group,
wherein $R^a$ and $R^b$ are each independently hydrogen, a substituted or unsubstituted C1 to C5 alkyl group, or a substituted or unsubstituted C3 to C10 cycloalkyl group, and
n and m are each independently an integer of 0 to 3.

2. The electrolyte for the rechargeable lithium battery of claim 1, wherein the compound represented by Chemical Formula 1 is represented by Chemical Formula 1-1 or Chemical Formula 1-2:

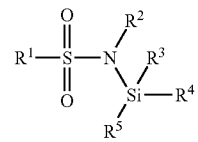

Chemical Formula 1-1

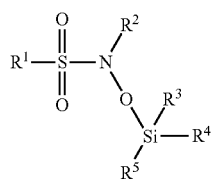

Chemical Formula 1-2 wherein, in Chemical Formula 1-1 and Chemical Formula 1-2,
$R^1$ to $R^5$ are each independently a substituted or unsubstituted C1 to C10 alkyl group, a substituted or unsubstituted C1 to C10 alkoxy group, a substituted or unsubstituted C2 to C10 alkenyl group, a substituted or unsubstituted C3 to C10 cycloalkyl group, a substituted or unsubstituted C3 to C10 cycloalkenyl group, or a substituted or unsubstituted C6 to C20 aryl group.

3. The electrolyte for the rechargeable lithium battery of claim 1, wherein $R^1$ to $R^5$ are each independently a substituted or unsubstituted C1 to C10 alkyl group, or a substituted or unsubstituted C2 to C5 alkenyl group.

4. The electrolyte for the rechargeable lithium battery of claim 1, wherein $R^1$ to $R^5$ are each independently a substituted or unsubstituted C1 to C5 alkyl group.

5. The electrolyte for the rechargeable lithium battery of claim 4, wherein $R^1$ to $R^5$ are each independently a methyl group.

6. The electrolyte for the rechargeable lithium battery of claim 1, wherein Chemical Formula 1 is represented by Chemical formula 1a or Chemical Formula 1b:

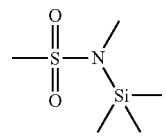

[Chemical Formula 1a]

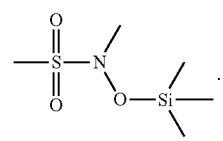

[Chemical Formula 1b]

7. The electrolyte for the rechargeable lithium battery of claim 1, wherein the compound represented by Chemical Formula 1 is comprised in an amount of about 0.1 wt % to about 10 wt % based on a total weight of the electrolyte for the rechargeable lithium battery.

8. The electrolyte for the rechargeable lithium battery of claim 1, wherein the compound represented by Chemical Formula 1 is comprised in an amount of about 0.5 wt % to about 3 wt % based on a total amount of the electrolyte for the rechargeable lithium battery.

9. The electrolyte for the rechargeable lithium battery of claim 1, wherein the additive is the compound represented by Chemical Formula 1.

10. A rechargeable lithium battery, comprising
a positive electrode;
a negative electrode; and
the electrolyte of claim 1.

11. The rechargeable lithium battery of claim 10, wherein the positive electrode comprises at least one active material selected from Li—Ni—Co—Al (NCA), Li—Ni—Co—Mn (NCM), lithium cobalt oxide (LiCoO$_2$), lithium manganese oxide (LiMnO$_2$), lithium nickel oxide (LiNiO$_2$), and lithium iron phosphate (LiFePO$_4$).

12. The rechargeable lithium battery of claim 10, wherein the compound represented by Chemical Formula 1 is represented by Chemical Formula 1-1 or Chemical Formula 1-2:

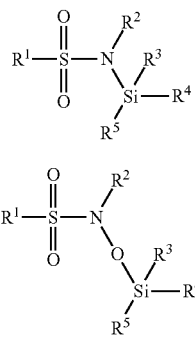

Chemical Formula 1-1

Chemical Formula 1-2 wherein, in Chemical Formula 1-1 and Chemical Formula 1-2,
$R^1$ to $R^5$ are each independently a substituted or unsubstituted C1 to C10 alkyl group, a substituted or unsubstituted C1 to C10 alkoxy group, a substituted or unsubstituted C2 to C10 alkenyl group, a substituted or unsubstituted C3 to C10 cycloalkyl group, a substituted or unsubstituted C3 to C10 cycloalkenyl group, or a substituted or unsubstituted C6 to C20 aryl group.

13. The rechargeable lithium battery of claim 10, wherein $R^1$ to $R^5$ are each independently a substituted or unsubstituted C1 to C10 alkyl group, or a substituted or unsubstituted C2 to C5 alkenyl group.

14. The rechargeable lithium battery of claim 10, wherein $R^1$ to $R^5$ are each independently a substituted or unsubstituted C1 to C5 alkyl group.

15. The rechargeable lithium battery of claim 10, wherein R1 to R5 are each independently a methyl group.

16. The rechargeable lithium battery of claim 10, wherein Chemical Formula 1 is represented by Chemical formula 1a or Chemical Formula 1b:

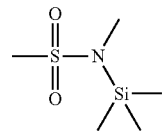

[Chemical Formula 1a]

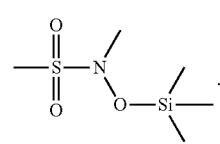

[Chemical Formula 1b]

17. The rechargeable lithium battery of claim 10, wherein the compound represented by Chemical Formula 1 is comprised in an amount of about 0.1 wt % to about 10 wt % based on a total weight of the electrolyte for the rechargeable lithium battery.

18. The rechargeable lithium battery of claim 10, wherein the compound represented by Chemical Formula 1 is comprised in an amount of about 0.5 wt % to about 3 wt % based on a total amount of the electrolyte for the rechargeable lithium battery.

19. The rechargeable lithium battery of claim 10, wherein the additive is the compound represented by Chemical Formula 1.

20. A method of manufacturing a rechargeable lithium battery, comprising
providing the electrolyte for the rechargeable lithium battery of claim 1 to a positive electrode and a negative electrode of the rechargeable lithium battery.

\* \* \* \* \*